(12) United States Patent
Michalak et al.

(10) Patent No.: US 12,042,058 B2
(45) Date of Patent: Jul. 23, 2024

(54) BODY-SUPPORTING COMPONENT AND METHOD OF PRODUCING A BODY-SUPPORTING COMPONENT

(71) Applicant: ADIENT ENGINEERING AND IP GMBH, Burscheid (DE)

(72) Inventors: Eric B. Michalak, Canton, MI (US); Shreyas Sansuddi, Ann Arbor, MI (US)

(73) Assignee: Adient US LLC, Plymouth, MI (US)

( * ) Notice: Subject to any disclaimer, the term of this patent is extended or adjusted under 35 U.S.C. 154(b) by 776 days.

(21) Appl. No.: 17/261,195

(22) PCT Filed: Jul. 19, 2019

(86) PCT No.: PCT/EP2019/069582
§ 371 (c)(1),
(2) Date: Jan. 19, 2021

(87) PCT Pub. No.: WO2020/016442
PCT Pub. Date: Jan. 23, 2020

(65) Prior Publication Data
US 2021/0259425 A1    Aug. 26, 2021

Related U.S. Application Data

(60) Provisional application No. 62/700,919, filed on Jul. 20, 2018.

(51) Int. Cl.
*A47C 7/28*    (2006.01)
*B33Y 50/00*   (2015.01)
*B33Y 80/00*   (2015.01)
*A47C 7/38*    (2006.01)
*A47C 7/40*    (2006.01)
(Continued)

(52) U.S. Cl.
CPC .............. *A47C 7/282* (2013.01); *B33Y 50/00* (2014.12); *B33Y 80/00* (2014.12); *A47C 7/38* (2013.01); *A47C 7/40* (2013.01); *A47C 7/54* (2013.01); *A47G 9/1009* (2013.01); *B60N 2/7017* (2013.01); *B60N 2/7094* (2013.01); *B62J 1/00* (2013.01); *B64D 11/0647* (2014.12)

(58) Field of Classification Search
CPC ........ A47C 7/282; B33Y 88/00; B33Y 50/00; B60N 2/7017
See application file for complete search history.

(56) References Cited

U.S. PATENT DOCUMENTS 10,343,565 B2 * 7/2019 Baek ..................... B60N 2/7017
10,398,236 B2 * 9/2019 Achten .................. B33Y 10/00
(Continued)

FOREIGN PATENT DOCUMENTS

EP    1757206 A1    2/2007
EP    2181887 A1    5/2010

OTHER PUBLICATIONS

PCT International Search Report and Written Opinion (PCT/EP2019/069582).

*Primary Examiner* — Syed A Islam
(74) *Attorney, Agent, or Firm* — Marshall & Melhorn, LLC

(57) ABSTRACT

A body-supporting component may have a main body. A 3D lattice structure of the main body may have deflection properties portions of the main body. The main body may be formed by a flexible material according to the 3D lattice structure combined with the deflection properties portions.

15 Claims, 4 Drawing Sheets

(51) Int. Cl.
*A47C 7/54* (2006.01)
*A47G 9/10* (2006.01)
*B60N 2/70* (2006.01)
*B62J 1/00* (2006.01)
*B64D 11/06* (2006.01)

(56) References Cited

U.S. PATENT DOCUMENTS

| | | | |
|---|---|---|---|
| 11,076,656 B2* | 8/2021 | Kormann | A43B 23/0245 |
| 2006/0022506 A1* | 2/2006 | Chan | A47C 31/116 |
| | | | 297/452.63 |
| 2018/0043805 A1 | 2/2018 | Baek et al. | |

* cited by examiner

BODY-SUPPORTING COMPONENT AND METHOD OF PRODUCING A BODY-SUPPORTING COMPONENT

BACKGROUND OF THE DISCLOSURE

The present disclosure relates generally to a body-supporting component and a method for producing a body-supporting component.

Body-supporting components, e.g. backrest or seating surface of a seat with curved outer form to support a body of a user are well-known.

SUMMARY OF THE DISCLOSURE

It is an object of the present disclosure to provide an improved body-supporting component and a method for producing such a body-supporting component.

According to the disclosure, the object regarding the body-supporting component is solved by the features claimed in claim 1. Regarding the method the object is solved by the features claimed in claim 10.

According to the disclosure, a body-supporting component is provided which comprises a main body having a 3D lattice structure wherein the 3D lattice structure of the main body define deflection properties portions of the main body and the main body is formed by a flexible material according to the 3D lattice structure combined with the deflection properties portions.

The flexible material is e.g. a flexible polyurethane material (shortly called FPU), a elastomeric polyurethane material (shortly called EPU), a thermoplastic polyurethane material (shortly called TPU) and/or thermoplastic elastomer material (shortly called TPE).

In particular, the 3D lattice structure is produced e.g. in a 3D printing process, e.g. in a selective laser sintering process (shortly named SLS) or in a fused deposition modeling (shortly named FDM), of the flexible material, e.g. of FPU. Additionally the 3D lattice structure is surrounded/covered and/or filled by a filler material, e.g. by TPU or TPE, e.g. in the 3D printing process, to form the body-supporting component as a monolithic component or one-piece component. The flexible materials, e.g. FPU, TPU, TPE, allow a 3D printing of the lattice structure and/or the filler/cover material with lighter weight and higher precision than it is possible with other manufacturing techniques. The materials also provide unique load-compression characteristics compared to the linear load-compression profile of the foam.

Such a body-supporting component provides for a seat allowing a monolithic component or one-piece seat component which avoids or replaces usual foam parts, trim parts and attachments in a seat. The complete seat structure is provided by the monolithic component or one-piece body-supporting component formed by a flexible material, e.g. polyurethane material with elastic/flexible properties on the bases of an e.g. diamond lattice structure. Such a body-supporting component has a reduced weight and a better heat transfer due to larger surface areas and a reduced cost of tooling, a waterproofing surface and is easy to clean, e.g. its surfaces from dirt, dust, grime, etc.

In one of the embodiments, the monolithic component or one-piece seat component can be produced by separately 3D printing the lattice structure, the filler material and the cover material using different materials like elastomeric polyurethane, flexible polyurethane, thermoplastic polyurethane and/or thermoplastic elastomer material and combining them in a second stage of thermal processing. In another embodiment, the lattice structure, the filler material and the cover material and can be 3D printed into a single structure using the same material but of different properties of load versus deflection.

The new lattice structure replaces the well-known foam element and the lattice or carrier structure for the seat attachment.

Existing foam deflection properties are used to create the lattice structure instead e.g. of the known pressure mapping, force versus deflection characteristics, etc. Using a lattice structure allows varying deflections throughout the lattice structure. By such a body-supporting component, elasticity can be changed in details according to places with deflection properties and thus elasticity in a portion or area of the component upon which a load is given can selectively be lowered.

The body-supporting component obtained by the monolithic or one-piece TPU/TPE component on the base of the lattice structure provides a part or component usable for furniture or an automobile, a mass transit vehicle, and an air craft such as a cushioning part or padding part or upholstery of a seat, a seat back and a dashboard, a saddle part for a bicycle, motorcycle or an all-terrain vehicle (ATV), a seat part of a chair for an office, a headrest, a bolster, an armrest, etc.

According to the disclosure, the 3D lattice structure comprises at least a plurality of cells formed by a plurality of beams connected with each other.

According to another aspect the beam elements have different thicknesses and/or lengths. The lattice structure can be optimized to provide the deflection similar to foam by varying the thickness of the beam elements and the density of the lattice structure.

Furthermore, the cells may have different shapes and/or sizes. A unique cell structure can be used to create a 3D lattice structure that replaces the foam volume.

The integrated 3D lattice structure allows supporting the user/occupant without the need for a foam part and/or trim part.

In another embodiment, the 3D lattice structure can be configured on current foam properties for hardness and static deflection. The 3D lattice structure can be modified based on type of the cell structure, e.g. unit cell structure and/or its size and/or its density.

Furthermore, the beam elements generated in the 3D lattice structure may comprise variable thinness to provide the desired deflections of the body-supporting component.

According to another aspect, the monolithic component forming the body-supporting component comprises at least an upper outer surface forming an upper outer cover, an inner portion formed by the 3D lattice structure forming a flexible carrier and a lower outer surface forming a bottom support or lower outer cover. In particular, the upper outer surface is configured to form the upper outer cover or contact surface of the body-supporting component and replaced the usual trim cover. The inner portion is configured to form a flexible carrier or padding layer or cushion layer of the body-supporting component and replaced the usual foam layer. The lower outer surface is configured to form a bottom support or a lower outer cover and replaced the usual base layer or seat attachment portion. No additional trimming is necessary. Such a monolithic body-supporting component is permanently waterproofed and robust part.

According to the disclosure, a method of producing a body-supporting component comprises the steps of:

providing a geometry body model of a desired main body, providing a 3D lattice structure of the main body defining deflection properties portions of the main body, forming the main body by the flexible material according to the 3D lattice structure combined with the deflection properties portions, e.g. in a 3D printing process.

In particular the geometry body model, e.g. a 3D model, may be created with a computer-aided design (CAD) package or by a 3D scanner or by a digital camera and photogrammetry software. The 3D model comprises at least the 3D lattice structure of the main body and the size, shape and/or dimensions of the body main comprising the 3D lattice structure and the inner portion and the upper and lower outer surfaces.

The 3D lattice structure is produced by the 3D printing process. The filling of the 3D lattice structure by a filling material, e.g. by at least one of the thermoplastic polyurethane and thermoplastic elastomer, is produced e.g. by the 3D printing process of the 3D lattice structure or separately by an injection moulding process into the 3D printed lattice structure.

The 3D lattice structure can be surrounded by a flexible material, e.g. by at least one of the thermoplastic polyurethane and thermoplastic elastomer. The surrounding process of the 3D lattice structure to form e.g. an outer cover can be provided during the 3D printing process of the 3D lattice structure or in a separate processing step, e.g. by injection molding.

According to another aspect the body-supporting component can be used as a base component, cushion component, pad component, a pillow or upholstery e.g. of a furniture, a vehicle seat, an aircraft seat, in particular a seat pan, a backrest, headrest, an armrest or a motorcycle seat pan.

The method supports the configuration of parts/components with complex geometries. The foam elements of the body-supporting components can be replaced with TPU or TPE to provide similar performance for reduced mass. The need for additional trimming element is prevented. The produced component provides a permanent solution for waterproofing.

BRIEF DESCRIPTION OF THE DRAWINGS

The present disclosure will become more fully understood from the detailed description given herein below and the accompanying drawings which are given by way of illustration only, and thus, are not limitative of the present disclosure, wherein.

Corresponding parts are marked with the same reference symbols in all figures.

DETAILED DESCRIPTION OF PREFERRED EMBODIMENTS

Figure 1:
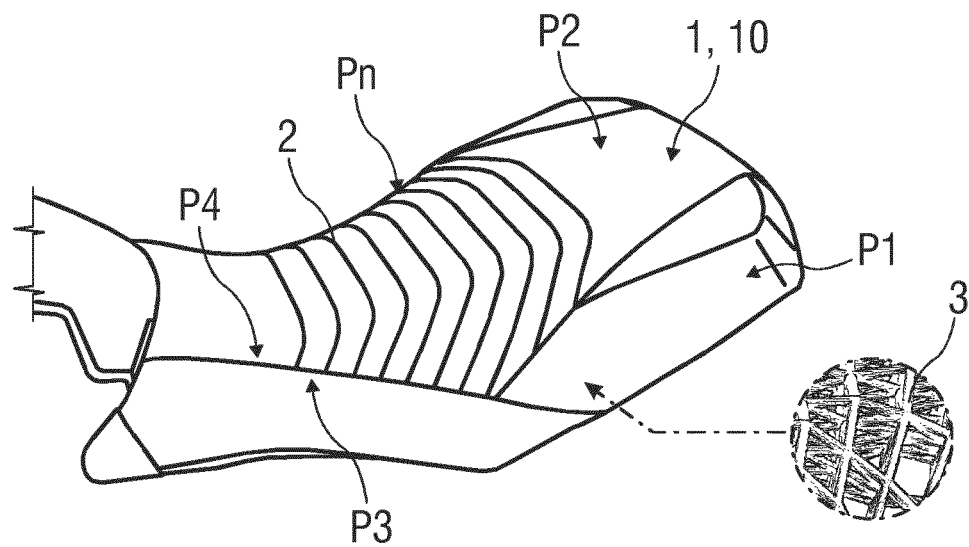
FIG. 1 shows an exemplary embodiment of a body-supporting component, e.g. a seat of a motorcycle/ATV.

FIG. 1 shows an exemplary embodiment of a body-supporting component 1. The body-supporting component 1 comprises a main body 2 which is shaped in accordance to a body of e.g. an occupant sitting on the component 1. The component 1 shown in FIG. 1 is e.g. a seat for a motorcycle or an ATV.

The body-supporting component 1 is produced as a monolithic component 10. The main body 2 is formed by a 3D lattice structure 3 defining different deflection properties portions P1 to Pn of the main body 2. In particular, a deflection properties portion P1 forms a side surface of the body-supporting component 1. Another deflection properties portions P2 and P3 form a seat pan portion and a seat pan side portion of the body-supporting component 1. The deflection properties portions P1 to Pn are characterized by different properties regarding e.g. flexibility, elasticity, stiffness, insertion depth, mechanical strength. The different deflection properties portions P1 to Pn are created by e.g. different shapes, forms, dimensions of portions of the 3D lattice structure 3.

Figure 2:
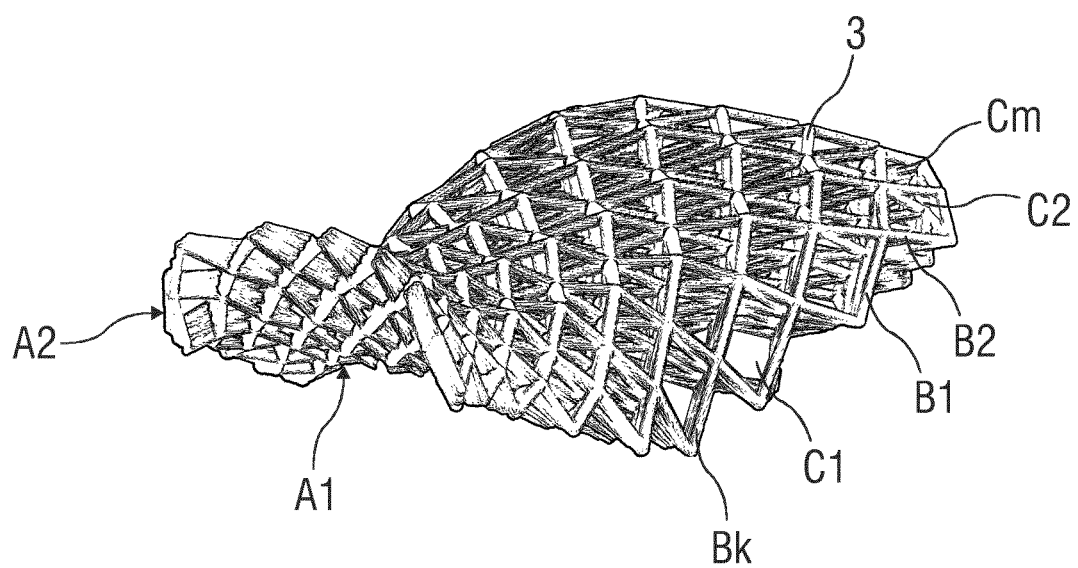
FIG. 2 shows a perspective view of a 3D lattice structure for the body-supporting component.

FIG. 2 shows a perspective view of a lattice structure 3, e.g. a 3D lattice structure for the body-supporting component 1. The 3D lattice structure 3 of the main body 2 defines deflection properties portions P1 to Pn of the main body 2 by different lattice structure areas e.g. by close-meshed lattice structure areas A1 and broad-meshed lattice structure areas A2.

The 3D lattice structure 3 comprises further at least a plurality of cells C1 to Cm formed by a plurality of beam elements B1 to Bk connected with each other. In particular, the cells C1 to Cm may have different shapes and/or sizes to form the different deflection properties portions P1 to Pn of the main body 2 and thus of the body-supporting component 1.

Figure 3A:
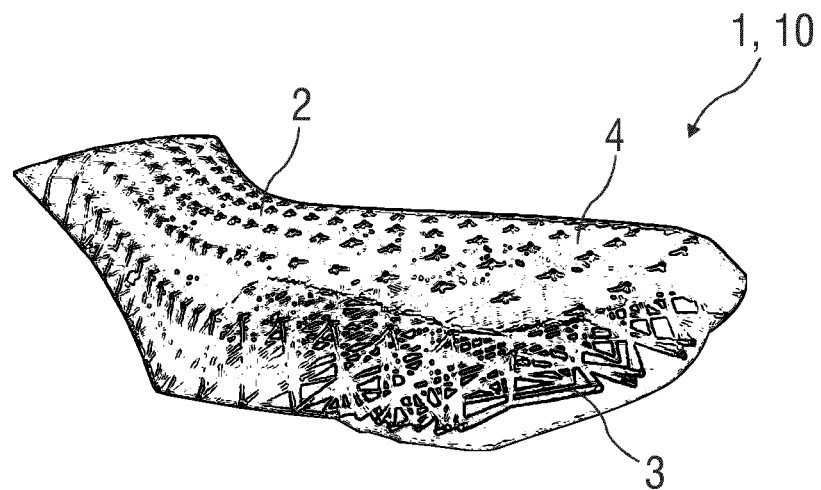
FIG. 3A, 3B shows a perspective view of the 3D lattice structure according to FIG. 2 filled/surrounded by a transparent or shiny filling material and an opaque or dark filling material.

FIG. 3A shows a perspective view of the 3D lattice structure 3 according to FIG. 2 filled/surrounded by a filling material 4, in particular a transparent or shiny filling material 4.

Figure 3B:
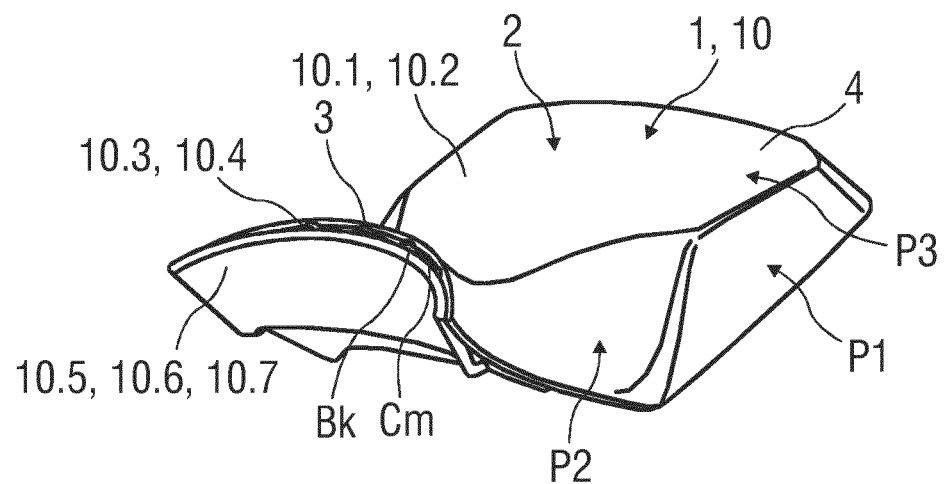

FIG. 3B shows a perspective view of the 3D lattice structure 3 according to FIG. 2 filled/surrounded by another filling material 4, in particular an opaque or dark filling material 4.

The main body 2 is formed by e.g. a flexible polyurethane material (shortly called FPU), an elastomeric polyurethane material (shortly called EPU), a thermoplastic polyurethane material (shortly called TPU) and/or thermoplastic elastomer material (shortly called TPE) according to the 3D lattice structure 3 combined with the deflection properties portions.

In particular, the 3D lattice structure 3 is e.g. 3D printed by the FPU and is surrounded and/or filled by the filling material 4, e.g. by TPU or TPE to form the main body 2.

The body-supporting component 1 is produced as a monolithic component 10 which comprises e.g. an upper outer surface 10.1 forming an upper outer cover 10.2, an inner portion 10.3 formed by the 3D lattice structure 3 forming a flexible carrier 10.4 or padding portion or cushion portion and a lower outer surface 10.5 forming a bottom support 10.6 and lower outer cover 10.7.

The body-supporting component 1 as a monolithic component 10 can be produced in an additive manufacturing process by joining a material under computer control to create the 3D body-supporting component 1. Usual casting, moulding and removing of material from the product are avoided.

According to the method a geometry body model of a desired main body 2 is provided, wherein a 3D lattice structure 3 of the main body 2 defining deflection properties portions P1 bis Pn of the main body 2 is further provided e.g. as a geometry body model and wherein the main body 2 is formed by a flexible material according to the 3D lattice structure 3 combined with the deflection properties portions P1 to Pn in one of the additive manufacturing processes, e.g. by a 3D printing process.

In particular, the 3D lattice structure 3 of the main body 2 is produced by the 3D printing process to form the inner portion 10.3, e.g. the flexible carrier 10.4. The filling of the 3D lattice structure 3 by the filling material 4, e.g. by at least one of the thermoplastic polyurethane and thermoplastic elastomer, is produced e.g. by the 3D printing process of the 3D lattice structure 3 or separately by an injection moulding process into the 3D printed lattice structure 3.

The 3D lattice structure 3 can be further surrounded by the same or a different flexible material, e.g. by at least one of the thermoplastic polyurethane and thermoplastic elastomer. The surrounding process of the 3D lattice structure 3 to form e.g. an outer cover 10.2 and/or 10.7 can be provided during the 3D printing process of the 3D lattice structure 3 or in a separate processing step, e.g. by injection molding.

Such a produced monolithic body-supporting component 1 can be used as a furniture component, a base component, cushion component, pad component, a pillow or upholstery e.g. of a furniture, a vehicle seat, an aircraft seat, in particular a seat pan, a backrest, headrest, an armrest or a motorcycle seat pan.

Figure 4:
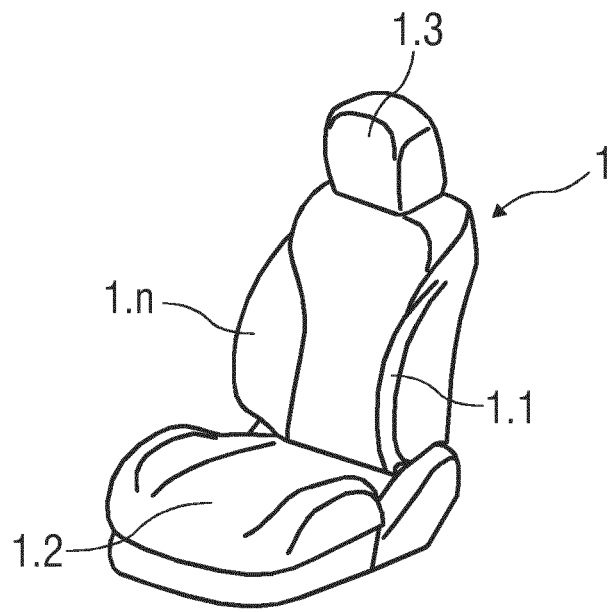
FIG. 4 shows another exemplary embodiment of a body-supporting component with different body-supporting elements.

FIG. 4 shows another exemplary embodiment of a body-supporting component 1 having different body-supporting elements 1.1 to 1.n, e.g. a lateral supporting element 1.1, a seating supporting element 1.2, a headrest 1.3.

Each of the body-supporting elements 1.1 to 1.n may be configured by a respective main body 2 formed by a respective 3D lattice structure 3 of the respective main body 2. In particular, the respective main body 2 may be formed by a polyurethane material according to its 3D lattice structure 3 combined with the deflection properties portions P1 bis Pn as described above for the body-supporting component 1.

Figure 5:
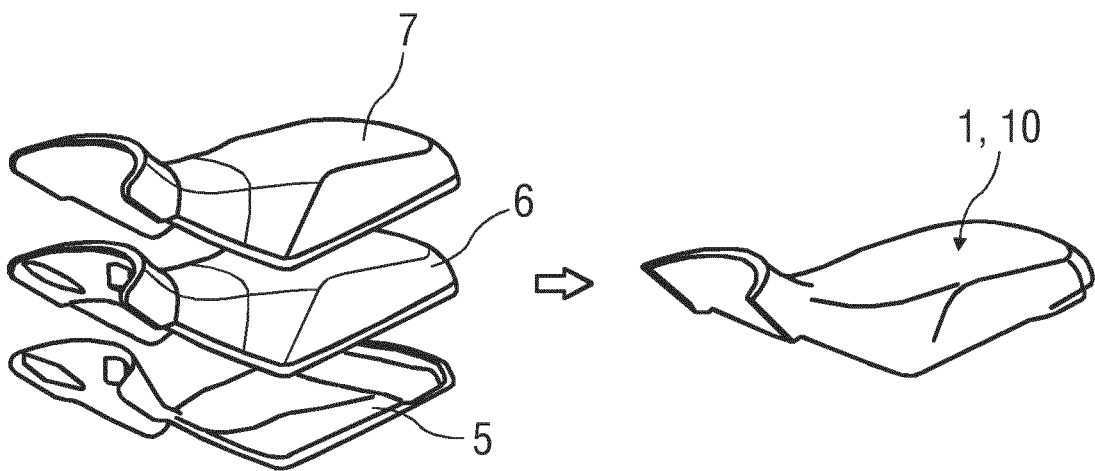
FIG. 5 shows a comparison of a well-known sear and the one-piece body-supporting component.

FIG. 5 shows a comparison of a well-known seat component having a seat attachment 5, a foam element 6 and a leather trim 7. The new body-supporting component 1 is a monolithic component 10 or a one-piece component which replaces the well-known multi-part seat component.

Figure 6:
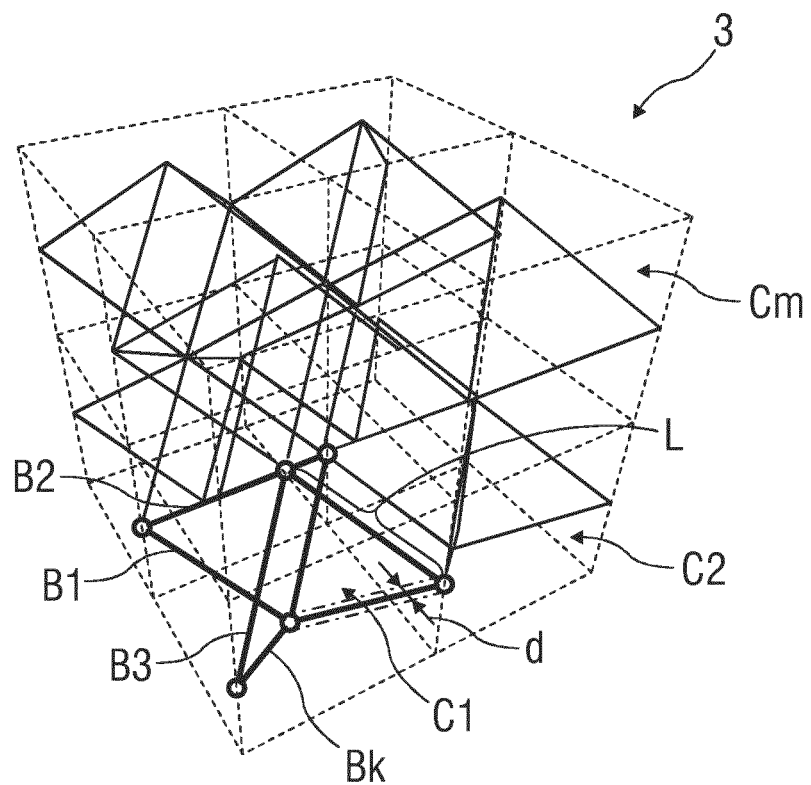
FIG. 6 shows a perspective view of a 3D lattice structure for the body-supporting component.

FIG. 6 shows a perspective view of an exemplary embodiment of a 3D lattice structure 3. The 3D lattice structure 3 comprises at least a plurality of cells C1 to Cm formed by a plurality of beam elements B1 to Bk connected with each other.

The beam elements B1 to Bk may have different thicknesses and/or lengths. The lattice structure 3 can be optimized to provide the deflection similar to foam by varying the thickness of the beam elements B1 to Bk and the density of the cells C1 to Cm of the lattice structure 3.

The cells C1 to Cm may have different shapes and/or sizes. A unique cell structure can be used to create a 3D lattice structure 3 that replaces the foam volume.

In particular, the beam elements B1 to Bk have different thicknesses d and/or lengths l to provide the different deflection properties portions P1 to Pn of the body-supporting component 1.

LIST OF REFERENCES 1 body-supporting component
10 monolithic component
10.1 upper outer surface
10.2 upper outer cover
10.3 inner portion
10.4 flexible carrier
10.5 lower outer surface
10.6 bottom support
10.7 lower outer cover
1.1 to 1.n body-supporting element
1.1 lateral supporting element
1.2 seating supporting element
1.3 headrest
2 main body
3 lattice structure
4 filling material
5 seat attachment
6 foam element
7 leather trim
A1 close-meshed lattice structure area
A2 broad-meshed lattice structure area
B1 to Bk beam element
C1 to Cm cell
d thickness
l length
P1 to Pn deflection properties portion

The invention claimed is:

1. A body-supporting component, comprising:
a main body and
a 3D lattice structure of the main body defining deflection properties portions of the main body,
wherein the main body is formed by a flexible material according to the 3D lattice structure combined with the deflection properties portions,
wherein the 3D lattice structure is filled by a filling material.

2. The body-supporting component according to claim 1, wherein the 3D lattice structure comprises at least a plurality of cells formed by a plurality of beam elements connected with each other.

3. The body-supporting component according to claim 2, wherein the beam elements have different thicknesses and/or lengths.

4. The body-supporting component according to claim 2, wherein the cells have different shapes and/or sizes.

5. The body-supporting component according to claim 2, wherein the main body is formed by at least one of the following flexible materials: a flexible polyurethane material, a elastomeric polyurethane material, a thermoplastic polyurethane material and thermoplastic elastomer material.

6. The body-supporting component according to claim 1, wherein the 3D lattice structure is 3D printed by the flexible polyurethane material or elastomeric polyurethane material.

7. The body-supporting component according to claim 6, wherein the 3D lattice structure is surrounded by a flexible material.

8. The body-supporting component according to claim 1, wherein said main body and said 3D lattice structure is configured as a monolithic component.

9. The body-supporting component according to claim 8, wherein the monolithic component comprises an upper outer surface forming an upper outer cover, an inner portion formed by the 3D lattice structure forming a flexible carrier or padding portion or cushion portion, wherein said padding or cushion portions are made of foam, and a lower outer surface forming a bottom support or lower outer cover.

10. A method of producing a body-supporting component according to claim 1, wherein the body-supporting component is produced as a monolithic component.

11. The method according to claim 10, comprising further steps of:
providing a geometry body model of a desired main body, providing a 3D lattice structure of the main body defining deflection properties portions of the main body, forming the main body by a flexible material according to the 3D lattice structure combined with the deflection properties portions.

12. The method according to claim 11, further comprising providing the 3D lattice structure of the main body by a 3D printing process.

13. The method according to claim 12, wherein the filling material includes at least one of a thermoplastic polyurethane and a thermoplastic elastomer.

14. The method according to claim 11, further comprising surrounding the 3D lattice structure by a flexible material, which includes at least one of a thermoplastic polyurethane and a thermoplastic elastomer.

15. The body-supporting component of claim 1, wherein the body-supporting component is a base component, cushion component, pad component, a pillow or upholstery for furniture, a vehicle seat, an aircraft seat, a seat pan, a backrest, headrest, an armrest or a motorcycle seat pan.

* * * * *